United States Patent
Zufall et al.

(10) Patent No.: US 11,956,072 B2
(45) Date of Patent: *Apr. 9, 2024

(54) METHOD AND SYSTEM FOR TIMING SYNCHRONIZATION IN A CELLULAR NETWORK

(71) Applicant: DISH WIRELSS L.L.C., Englewood, CO (US)

(72) Inventors: David Zufall, Lone Tree, CO (US); Pareshkumar Panchal, Highlands Ranch, CO (US); William Ver Steeg, Buford, GA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,387

(22) Filed: Feb. 17, 2023

(65) Prior Publication Data
US 2023/0198649 A1 Jun. 22, 2023

Related U.S. Application Data

(63) Continuation of application No. 16/938,624, filed on Jul. 24, 2020, now Pat. No. 11,616,588.

(51) Int. Cl.
*H04J 3/06* (2006.01)
*G01S 5/02* (2010.01)
(Continued)

(52) U.S. Cl.
CPC ........ *H04J 3/0661* (2013.01); *G01S 5/02216* (2020.05); *H04W 56/001* (2013.01); *H04W 80/02* (2013.01)

(58) Field of Classification Search
CPC . H04J 3/0661; G01S 5/02216; H04W 56/001; H04W 80/02; H04W 56/0015
See application file for complete search history.

(56) References Cited

U.S. PATENT DOCUMENTS 5,999,124 A * 12/1999 Sheynblat ............... G01S 19/46
342/357.29
8,345,561 B2 * 1/2013 Edwards ............. H04L 43/0876
370/537
(Continued)

FOREIGN PATENT DOCUMENTS

EP 2026485 A1 2/2009
EP 2131620 A1 12/2009
(Continued)

OTHER PUBLICATIONS

International Preliminary Report on Patentability received for PCT Patent Application No. PCT/US2021/042793, dated Feb. 2, 2023, 13 pages.
(Continued)

*Primary Examiner* — Wutchung Chu
(74) *Attorney, Agent, or Firm* — Jeremiah J. Baunach; VLP Law Group LLP

(57) ABSTRACT

An aggregate cell of a cellular network includes a plurality of dispersed modular cells. The modular cells each include a cellular radio and collectively perform the function of a cellular base station. A distributed clock is established by transmitting timing beacons from one or more of the modular cells. Each modular cell receives the timing beacons. Each modular cell that transmits a timing beacon provides a transmission timestamp to a cell controller. Each modular cell that receives a timing beacon provides a reception timestamp to the cell controller. The cell controller schedules signal transmissions from the modular cells based on the transmission and reception timestamps.

20 Claims, 10 Drawing Sheets

(51) Int. Cl.
*H04W 56/00* (2009.01)
*H04W 80/02* (2009.01)

(56) References Cited

U.S. PATENT DOCUMENTS

| | | | |
|---|---|---|---|
| 8,787,954 B2 | 7/2014 | Richardson et al. | |
| 10,075,813 B1 | 9/2018 | Struhsaker et al. | |
| 2007/0025481 A1* | 2/2007 | Ryu | H04J 3/0667 370/503 |
| 2008/0175275 A1* | 7/2008 | Garner | H04J 3/0667 370/503 |
| 2009/0052431 A1 | 2/2009 | Kroener et al. | |
| 2010/0135263 A1 | 6/2010 | Zakrzewski | |
| 2011/0150005 A1* | 6/2011 | Chen | H04J 3/0667 370/503 |
| 2011/0255528 A1 | 10/2011 | Zakrzewski | |
| 2013/0170388 A1* | 7/2013 | Ito | H04L 12/403 370/252 |
| 2014/0219162 A1* | 8/2014 | Eyuboglu | H04L 12/4641 370/315 |
| 2014/0219255 A1* | 8/2014 | Eyuboglu | H04B 7/04 370/336 |
| 2014/0219267 A1* | 8/2014 | Eyuboglu | H04W 56/001 370/350 |
| 2015/0003329 A1* | 1/2015 | Morita | H04W 24/10 370/328 |
| 2015/0043543 A1* | 2/2015 | Uchino | H04W 56/0045 370/336 |
| 2015/0124675 A1* | 5/2015 | Farmer | H04W 56/002 370/311 |
| 2016/0037550 A1* | 2/2016 | Barabell | H04W 72/1263 455/450 |
| 2016/0044630 A1 | 2/2016 | Markhovsky et al. | |
| 2018/0263004 A1* | 9/2018 | Andersson | H04W 16/28 |
| 2018/0351676 A1* | 12/2018 | Butterworth | H04J 3/0667 |
| 2019/0116585 A1* | 4/2019 | Chakraborty | H04L 5/0098 |
| 2020/0137704 A1* | 4/2020 | Vermani | H04L 5/0035 |
| 2020/0259896 A1* | 8/2020 | Sachs | H04J 3/0667 |
| 2020/0336781 A1* | 10/2020 | Ramaswamy | G06F 16/7834 |
| 2021/0051653 A1* | 2/2021 | Park | H04W 72/21 |
| 2021/0075585 A1* | 3/2021 | Tanwar | H04J 3/0667 |
| 2021/0112512 A1* | 4/2021 | Dickie | G06F 1/12 |
| 2021/0314892 A1* | 10/2021 | Rico Alvarino | H04W 72/23 |
| 2022/0120915 A1* | 4/2022 | Hoptroff | H04L 69/28 |

FOREIGN PATENT DOCUMENTS

| | | | |
|---|---|---|---|
| EP | 2378822 A2 * | 10/2011 | H04J 3/0667 |
| EP | 2378822 A2 | 10/2011 | |
| WO | 2011/000041 A1 | 1/2011 | |
| WO | 2022/020603 A2 | 1/2022 | |

OTHER PUBLICATIONS

International Search Report and Written Opinion received for PCT Patent Application No. PCT/US2021/042793, dated Feb. 11, 2023, 17 pages.

Mattia Rizzi, "Digital Dual Mixer Time Difference: Phase noise & stability", download date Jun. 21, 2021, 38 pages. URL: https://www.ohwr.org/project/wr-low-jitter/uploads/62c4f265c806154bef2a067600d3e15e/DDMTD_report_final.pdf.

\* cited by examiner

METHOD AND SYSTEM FOR TIMING SYNCHRONIZATION IN A CELLULAR NETWORK

BACKGROUND

Technical Field

The present disclosure relates to the field of cellular communication systems.

Description of the Related Art

Cellular communication networks typically include a plurality of cells. Each cell corresponds to a geographic area. Each cell typically includes a base station. The base station includes a cellular radio. Macro cellular radios are typically mounted on an elevated outdoor location such as the top of a building. Small cellular radios are typically mounted indoor, or on opportunistic mounting locations. The base station provides cellular communication service to user equipment, such as mobile phones, in the geographical area of the cell.

BRIEF SUMMARY

In one embodiment, a method includes transmitting a first timing beacon from a first primary modular cell of an aggregate cell and transmitting a second timing beacon from a second primary modular cell of the aggregate cell. The method includes receiving the first timing beacon at the second primary modular cell and receiving the second timing beacon at the first primary modular cell. The method includes providing, to a cell controller of the aggregate cell, a transmission time stamp of the first timing beacon by the first primary modular cell, a transmission time stamp of the second timing beacon by the second primary modular cell, a reception timestamp of the first timing beacon by the second primary modular cell, and a reception timestamp of the second timing beacon by the first primary modular cell. The method includes scheduling, with the cell controller, cellular transmissions from the first and second primary modular cells to user equipment based on the transmission timestamps and the reception timestamps.

In one embodiment, a method includes managing, with a cell controller, an aggregate cell including a primary modular cell and a plurality of secondary modular cells and receiving, with the primary modular cell, an out of band timing signal. The method includes transmitting, from the primary modular cell, a timing beacon including a transmission time stamp indicating a transmission time of the timing beacon from the primary modular cell. The method includes receiving the timing beacon at each of the plurality of secondary cells and generating, with each secondary cell, a respective reception time stamp indicating a reception time of the timing beacon by the secondary modular cell. The method includes providing the transmission time stamp and the reception time stamps to the cell controller and calculating, with the cell controller, a respective a clock offset for each secondary modular cell based on the timing stamp.

In one embodiment, a media receiving device includes media reception circuitry configured to receive a media stream and media output circuitry configured to output the media stream to an electronic device for display on the electronic device. The media receiving device includes a modular cell configured to provide cellular communication services to user equipment as part of an aggregate cell. The modular cell is configured to receive a timing signal, output a timing beacon to other modular cells of the aggregate cell based on the timing signal, and to provide a transmission timestamp of the timing beacon to a cell controller of the aggregate cell.

DETAILED DESCRIPTION

Figure 1:
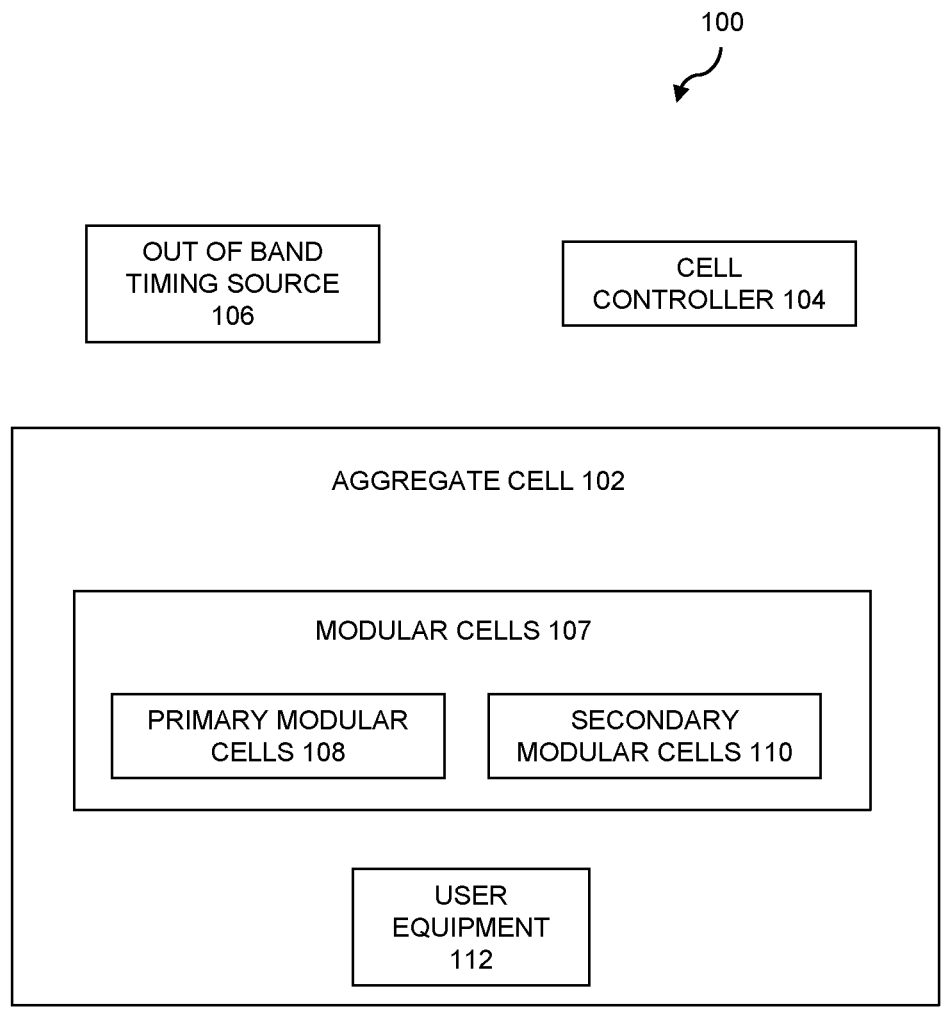
FIG. 1 is a block diagram of a cellular communication system, according to one embodiment.

FIG. 1 is a block diagram of a cellular communication system 100, according to an embodiment. The cellular communication system 100 includes an aggregate cell 102, a cell controller 104, and an out of band timing source 106. The aggregate cell 102 includes one or more modular cells 107. There are two types of modular cells—primary modular cells 108 and secondary modular cells 110. The components of the cellular communication system 100 cooperate to provide a cellular communication network. The cellular communication network can enable communication between user equipment such as cellular phones, tablets, laptop computers, and other electronic devices.

In one embodiment, the aggregate cell 102 provides cellular communication services to authorized user equipment in the geographical area covered by the aggregate cell 102. User equipment can include mobile phones, tablets, or other cellular-enabled electronic devices. While only a single aggregate cell 102 is illustrated in FIG. 1, in practice, the cellular communication system 100 may include a plurality of aggregate cells each configured to provide cellular communication services to user equipment in the geographic area corresponding to the cell.

The aggregate cell 102 includes a plurality of dispersed, modular cells 107 that each communicate with user equipment. The modular cells 107 correspond to relatively small, low power cellular radios compared to the cellular radio of a traditional base station. The modular cells 107 are dispersed throughout the geographic area of the aggregate cell 102. The modular cells 107 and the cell controller 104 collectively perform the role of a single large cellular radio of the base station of a traditional macro cell.

A single aggregate cell made up of multiple smaller radios, i.e., the modular cells 107, comes with various challenges. One particular challenge is managing clock distribution among the various modular cells 107. The timing of signals between the various modular cells 107 and user equipment may call for timing resolution on the order of several nanoseconds. While a traditional base station radio may establish a clock based on a GPS disciplined oscillator, in the aggregate cell 102 many of the secondary modular cells 110 may not have GPS receivers. Furthermore, the primary modular cells 108 may be positioned indoors and may not be able to reliably receive GPS signals to synchronize an internal real time clock.

In one embodiment, multiple modular cells 107 of the aggregate cell 102 may simultaneously communicate with a single user equipment. In particular, multiple modular cells 107 may provide the same data packets to a single user equipment to improve the signal-to-noise ratio of data packets received by the user equipment. The multiple modular cells 107 will be separated by various distances from the user equipment and from each other. The speed of light is about 0.3 m/ns. Accordingly, when the timing of signal arrival is expected to be accurate within a few nanoseconds, the relative distances and the timings of signal transmission greatly affect whether additive signal reception is achieved. To achieve the additive effect of the same data packet arriving at a user equipment for multiple modular cells 107, the timing difference tolerance in the arrival of the data packet from multiple sources may be quite small. For example, in 5G cellular communication systems the timing difference tolerance may be on the order of tens of nanoseconds. If the data packets arrive at the user equipment separated by times greater than the tolerance, not only will the additive benefits the lost, but a destructive effect may occur in which the user equipment may be unable to decipher the data packets. Accordingly, it is highly beneficial to schedule the transmission of data packets from the multiple modular cells 107 within tight tolerances.

In one embodiment, the modular cells 107, the cell controller 104, and the out of band timing source 106 cooperate to establish reliable clock synchronization between the modular cells 107. One or more of the primary modular cells 108 receives a timing signal from the out of band timing source 106. The one or more primary modular cells 108 issues timing beacons to the other modular cells 107 based on the timing signal. Secondary modular cells 110 may also send beacons, but these beacons are typically less precisely timed than the primary beacons. Each modular cell 107 that issues a timing beacon reports, to the cell controller 104, the time at which the timing beacon was issued. Each modular cell 107 that receives a timing beacon reports, to the cell controller 104, the time at which the timing beacon was received. The cell controller 104 determines the relative offsets in the internal clocks of each modular cell based on the transmission and reception times of the timing beacons. The cell controller 104 then schedules signal transmission from each of the modular cells 107 based on the calculated relative offsets in the internal clocks of the modular cells 107. Further details regarding the out of band timing source 106, the transmission and receipt of timing beacons, and the functions performed by the cell controller 104 are set forth below.

In one embodiment, the modular cells 107 include one or more primary modular cells 108 and one or more secondary modular cells 110. The one or more primary modular cells 108 receive timing signals from the out of band timing source 106 and issue timing beacons to the secondary modular cells 110 and to the other primary modular cells 108. In one embodiment, the secondary modular cells 107 do not issue timing beacons. Each primary modular cell 108 reports the transmission time of its timing beacons to the cell controller 104. Each primary modular cell 108 and secondary modular cell 110 reports the receipt times of the timing beacons to the cell controller 104.

In one embodiment, the aggregate cell 102 includes only a single primary modular cell 108. The primary modular cell 108 receives a timing signal from the out of band timing source 106 (described in greater detail below). The primary modular cell 108 transmits a timing beacon to the secondary modular cells 110. The timing beacon includes a transmission timestamp indicating the time that the timing beacon was transmitted. The timestamp is based on the internal clock of the primary modular cell 108 synchronized with the out of band timing source 106. The timing beacon may also include other information about the primary modular cell 108 that transmitted the timing beacon. For example, the timing beacon may include an identification code identifying the primary modular cell. The timing beacon may include a location of the primary modular cell.

The primary modular cell 108 may transmit the timing beacon in band or out of band. In band transmission corresponds to transmitting the timing beacon with a frequency band used by the aggregate cell 102 to communicate with user equipment. Out of band transmission corresponds to transmitting the timing beacon in a frequency outside of the frequency band used by the aggregate cell 102 to communicate with user equipment. Further details regarding in band and out of band transmission are provided below.

After the primary modular cell 108 transmits the timing beacon, the primary modular cell 108 provides metadata to the cell controller 104. The metadata includes the transmission timestamp of the timing beacon, the identification of the primary modular cell 108, and the location of the primary modular cell 108.

The secondary modular cells 110 receive the timing beacon from the primary modular cell 108. The secondary modular cells 110 may receive the timing beacon in band or out of band. When the secondary modular cells 110 receive the timing beacon, the secondary modular cells 110 each provide metadata to the cell controller 104. The metadata can include the reception timestamp of the timing beacon and an identification of the secondary modular cell 110. The reception timestamp is based on an internal clock of the secondary modular cell 110.

The cell controller 104 utilizes the metadata received from the primary modular cell 108 and the secondary modular cells 110 to establish coordinated timing between the primary modular cell 108 and the secondary modular cells 110. In particular, the cell controller 104 can utilize the transmission and receipt timestamps related to the timing beacon to calculate signal latencies between the primary modular cell 108 and the secondary modular cells 110. The signal latencies can indicate how far apart the primary modular cell 108 and the secondary modular cells 110 are. This information can be utilized by the cell controller 104 to schedule signals from the primary modular cell 108 and the secondary modular cells 110. Accordingly, the cell controller 104 utilizes the transmission and receipt timestamps associated with timing beacon to establish timing synchronization between the primary modular cell 108 and the secondary modular cells 110.

In one embodiment, the aggregate cell 102 includes multiple primary modular cells 108 and multiple secondary modular cells 110. A first primary modular cell 108 receives a timing signal from the out of band timing source 106. The first primary modular cell 108 transmits a timing beacon to the secondary modular cells 110 and to the other primary modular cells 108 of the aggregate cell 102. The timing beacon includes a transmission timestamp indicating the time that the timing beacon was transmitted. The timestamp is based on the internal clock of the first primary modular cell 108 synchronized with the out of band timing source 106. The timing beacon may also include other information about the first primary modular cell 108 that transmitted the timing beacon. For example, the timing beacon may include an identification code identifying the first primary modular cell. The timing beacon may include a location of the first primary modular cell.

After the first primary modular cell 108 transmits the timing beacon, the first primary modular cell 108 provides metadata to the cell controller 104. The metadata includes the transmission timestamp of the timing beacon, the identification of the first primary modular cell 108, and the location of the first primary modular cell 108.

The secondary modular cells 110 and the other primary modular cells 108 receive the timing beacon from the first primary modular cell 108. The secondary modular cells 110 and the other primary modular cells 108 may receive the timing beacon in band or out of band. When the secondary modular cells 110 and the other primary modular cells 108 receive the timing beacon, the secondary modular cells 110 and the other primary modular cells 108 each provide metadata to the cell controller 104. The metadata can include the reception timestamp of the timing beacon, an identification of the secondary modular cell 110 or primary modular cell 108 that receives the timing beacon, and the identification of the first primary modular cell that transmitted the timing beacon. The reception timestamp is based on an internal clock of the secondary modular cell 110 or primary modular cell 108 that received the timing beacon.

A second primary modular cell 108 transmits a timing beacon based on a timing signal received from the out of band timing source 106. The timing beacon transmitted by the second primary modular cell 108 includes a transmission timestamp based on an internal clock of the second primary modular cell 108 and the out of band timing source 106. The timing beacon transmitted by the second primary modular cell 108 can include the same types of data as the timing beacon transmitted by the first primary modular cell 108. The second primary modular cell 108 also provides metadata to the cell controller 104 including the transmission timestamp of the timing beacon and other types of data as described above in relation to the first primary modular cell 108.

The secondary modular cells 110 and the other primary modular cells 108, including the first primary modular cell 108, receive the timing beacon from the second primary modular cell 108. The secondary modular cells 110 and the other primary modular cells 108 each provide metadata to the cell controller 104 including reception timestamps and other data as described above in relation to the timing beacon transmitted by the first primary modular cell 108.

The remaining primary modular cells 108 also transmit timing beacons and provide metadata to the cell controller 104 in the same manner as described in relation to the first and second primary modular cells 108. All primary modular cells 108 and secondary modular cells 110 that received the timing beacons provide metadata to the cell controller 104 in the same manner as described above in relation to the first and second primary modular cells.

The secondary modular cells 110 optionally transmit timing beacons and provide metadata to the cell controller 104 in the same manner as described in relation to the first and second primary modular cells 108. All primary modular cells 108 and secondary modular cells 110 that receive the timing beacons provide metadata to the cell controller 104 in the same manner as described above in relation to the first and second primary modular cells The cell controller 104 utilizes the metadata related to transmission and reception of the timing beacons to synchronize timing among the primary modular cells 108 and the secondary modular cells 110. The cell controller 104 analyzes the transmission and reception timestamps associated with the timing beacon sent from the various primary modular cells 108 to determine timing offsets and relative positions between the various modular cells 107 of the aggregate cell 102. The cell controller 104 can determine if the internal clocks of the various secondary modular cells 110 are out of sync with the internal clocks of the primary cells 108, and by how much, based on the transmission and reception timestamps related to the various timing beacons. The cell controller 104 can accurately determine the positions of each of the primary modular cells 108 and the secondary modular cells 110 based on the transmission and reception timestamps related to the various timing beacons. The cell controller 104 can then utilize this information to schedule data transmissions by each of the modular cells 107 to user equipment.

The cell controller 104 controls the overall communication between modular cells 107 and user equipment 112 based on the timing and location data obtained based on the transmission and reception timestamps associated with the timing beacons. The cell controller 104 can determine which modular cells 107 should communicate with various user equipment 112. For example, if multiple modular cells 107 in the aggregate cell 102 receive signals from user equipment 112, the cell controller 104 can determine the location of the user equipment 112 and can determine which modular cell 107 or modular cells 107 should communicate with the user equipment 112.

The cell controller 104 controls the timing of signals transmitted by the various modular cells 107. The cell controller 104 may determine that multiple modular cells 107 should transmit the same data packets to a single user equipment 112 in the additive manner described above. The cell controller 104 uses the derived knowledge of the clock offsets of the various modular cells 107 and the relative positions of the various modular cells 107 to schedule the precise transition time of data packets from each modular cell 107 based on the internal clocks of each modular cell 107 so that the data packets arrive substantially simultaneously at the user equipment 112. Thus, even if the internal clocks of various modular cells 107 are out of sync with each other, the cell controller 104 is aware of the offset between the internal clocks of the various modular cells 107 and takes this into account when providing transmission times to each modular cell 107 for the data packets. In this way, the cell controller 104 can ensure that all user equipment 112 communicating with the aggregate cell 102 is provided with effective cellular communication service.

In one embodiment, the cell controller 104 is implemented in a cloud computing environment. Accordingly, the cell controller 104 may include physical and virtual processing resources, memory resources, and data transmission resources that are located or implemented remotely from the modular cells 107 of the aggregate cell 102. The cloud-based cell controller 104 can communicate with the modular cells 107 via the Internet or other networks in conjunction with the cellular communication services provided by the aggregate cell 102.

In one embodiment, the cell controller 104 is implemented, at least partially, with computing resources associated with one or more of the modular cells 107. While each modular cell 107 may include one or more transceivers, memory resources, processing resources, and other computing resources associated with cellular network communication, at least one of the modular cells 107 may include additional computing resources for implementing the cell controller 104. The computing resources of the cell controller 104 may be housed with other computing resources associated with the cellular communication resources of the modular cell 107. The computing resources of the cell controller 104 may be physically separate from computing resources associated with the cellular communication resources of the modular cell 107.

In one embodiment, the cell controller 104 is distributed among multiple of the modular cells 107. In this case, computing resources of the cell controller 104 may be distributed among multiple of the modular cells 107. Furthermore, in one embodiment, the computing resources associated with the cell controller 104 may be distributed among cloud computing resources, and computing resources associated with one or more of the modular cells 107. In one embodiment, the cell controller 104 may be implemented with computing resources physically located within a geographic area associated with the aggregate cell 102, but separate from all of the modular cells 107. Those of skill in the art will recognize, in light of the present disclosure, that there are many ways to implement a cell controller 104 in accordance with principles of the present disclosure.

In one embodiment, the out of band timing source 106 is a GPS based timing source. The GPS based timing source includes GPS satellites that issue timing signals. Accordingly, a primary modular cell 108 may be positioned to receive a timing signal from one or more GPS satellites. The primary modular cell 108 calibrates or synchronizes its internal clock with the timing signal from the GPS satellites. The primary modular cell 108 may then transmit its timing beacons with timestamps based on the timing signals from the GPS satellites. Multiple of the primary modular cells 108 may transmit timing beacons based on GPS timing signals. In this example, the primary modular cells 108 may be positioned outside. Alternatively, the primary modular cells 108 may be positioned indoors, but may be coupled to one or more antennas that are positioned outside in order to receive GPS timing signals.

In one embodiment, the out of band timing source 106 is a media stream timing source. The media stream timing source can include an MPEG-2 television stream. MPEG-2 television streams include highly precise timing signals for controlling start and finish times of television programs and start and finish times of commercial breaks within television programs. One or more primary modular cells 108 may be configured to receive timing data from the MPEG-2 television streams and may synchronize their internal clocks with the timing data from the MPEG-2 television streams. In one embodiment, an MPEG transport demultiplexer listens for data with a particular packet identifier (PID). On regular intervals the head end puts MPEG private data on that PID. The interval may be 1 s, in one example, though other intervals can be used. The system can tolerate some imprecision in the intervals because all of the modular cells 107 receivers within the aggregate cell will get the data at the exact same time, plus or minus small offsets due to time of flight. The transport demultiplexer places the I/Q values of the specified PID in memory, along with a timestamp from the internal clock 134. The MPEG decoder recognizes the private data and signals to the FPGA that the I/Q values from the MPEG private data are in memory. The FPGA finds the exact start and end of the MPEG private data in memory, and, thus, the exact time when the private data arrived at the receiver. The modular cell sends the exact time arrival of the private data to the cell controller 104. The cell controller 104 can use the time of arrival from each modular cell 107 to calculate the relative time offset of each modular cell 107. Other types of television stream timing sources can be utilized without departing from the scope of the present disclosure.

Figure 2:
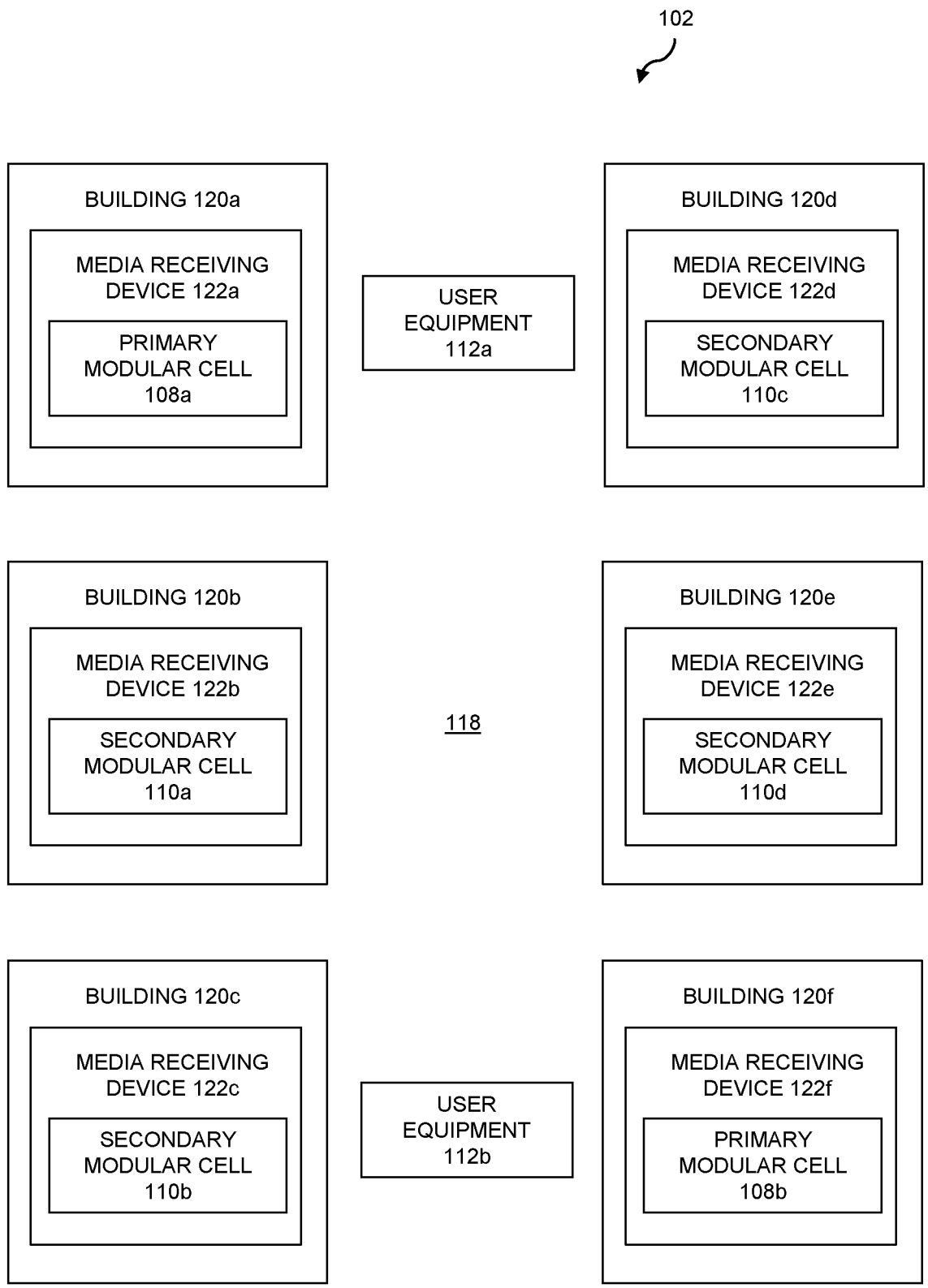
FIG. 2 is a block diagram of an aggregate cell, according to one embodiment.

FIG. 2 is a block diagram of a geographical region 118 in which an aggregate cell 102 is implemented, according to one embodiment. A plurality of buildings 120*a*-120*f* are located within the geographical region 118. Each building 120*a*-120*f* includes a respective media receiving device 122*a*-*b*. Each media receiving device 120*a*-120*f* includes either a primary modular cell 108*a*, 108*b* or a secondary modular cell 110*a*-110*d*. The primary modular cells 108*a*, 108*b* and the secondary modular cells 110*a*-110*d* makeup an aggregate cell 102 that provides cellular communication services to user equipment, such as the user equipment 112*a*, 112*b*.

In one embodiment, the media receiving devices 122*a*-122*f* are configured to provide video and audio media to residents of the buildings 120*a*-120*f* or to individuals visiting the buildings 120*a*-120*f*. The media receiving devices 122*a*-122*f* can provide television feeds, video streaming feeds, audio streaming feeds, digital recording feeds, or other types of audio or video media. The media receiving devices 122*a*-122*f* can be coupled via a wireless or wired connection to one or more electronic devices that include a display such as a television, a computer monitor, a tablet, a desktop computer, a smart phone, a laptop computer, or other types of electronic devices that include displays. Alternatively, or additionally, the media receiving devices 122*a*-122*f* can include their own displays. The media receiving devices 122*a*-122*f* can provide video media to the displays.

In one embodiment, the media receiving devices 122*a*-122*f* are part of a satellite television system. In this case, a respective satellite receiver may be mounted to an exterior of each building 120*a*-120*f*. The satellite receivers may be coupled to the media receiving devices 122*a*-122*f* by a wired or wireless connection. The satellite receivers may receive a satellite television stream from one or more satellites. The satellite receivers provide the satellite television streams to the media receiving devices 122*a*-122*f*. The media receiving devices 122*a*-122*f* provide content from the satellite television streams to the electronic devices that display the media content.

In one embodiment, the media receiving devices 122*a*-122*f* are part of a cable television system. Each media receiving device 122*a*-122*f* receives a cable television stream from a cable television system. The media receiving devices 122*a*-122*f* provide content from the cable television streams to the electronic devices that display the media content.

In one embodiment, the media receiving devices 122*a*-122*f* are set-top boxes of a television provider system or other media provider system.

Each media receiving device 122*a*-122*f* includes a modular cell 107. The modular cells 107 provide cellular communication services to user equipment 112*a* within the geographic region 118. The modular cells 107 each include one or more cellular radios configured to transmit and receive cellular signals within one or more frequency bands allotted to the aggregate cell 102. The modular cells 107 each include memory and processing resources for providing cellular communication services. Accordingly, the media receiving devices 122a-122f not only include computing resources for receiving, processing, and outputting media content, but also include hardware and software resources of the modular cells 107. In one embodiment, each media receiving device 122a-122f can include hardware and software resources that are shared for providing traditional media receiving device functionality and modular cell functionality.

In the example of FIG. 2, the media receiving devices 122a, 122f include primary modular cells 108a, 108b. The media receiving devices 122b-122e include secondary modular cells 110a-110d. The primary modular cells 108a, 108b function in the manner described for primary modular cells 108 in relation to FIG. 1. The secondary modular cells 122b-122d function in the manner described for secondary modular cells 110 in relation to FIG. 1. Though FIG. 2 illustrates an aggregate cell 102 with six modular cells 107, in practice, an aggregate cell 102 can include fewer or many more modular cells than six. In some cases, an aggregate cell 102 may include 100 or more modular cells 107. Though FIG. 2 illustrates that each building includes a single media receiving device 122 having a modular cell 107, in practice, a single building can include multiple media receiving devices each including a modular cell of the aggregate cell 102. Other buildings in the geographic area 118 may not include any media receiving devices 122 having a modular cell 107.

As described in relation to FIG. 1, the primary modular cells 108a and 108b each receive timing signals from an out of band timing source 106 (see FIG. 1) and broadcast timing beacons. Each primary modular cell receives the timing beacons broadcast by the other (or others when there are more than 3 primary modular cells 108). Each secondary modular cell 110a-110d receives the timing beacons broadcast by the primary modular cells 108a and 108b. The primary modular cells 108a and 108b provide metadata to the cell controller 104 indicating the timestamps at which they broadcasted the respective timing beacons. The primary modular cells 108a and 108b, and the secondary modular cells 110a-110d provide metadata to the cell controller 104 indicating, among other things, the timestamps at which they received the timing beacons.

The cell controller 104 utilizes the timing beacon transmission and reception timestamps, the geolocation data, and the identification data included in the metadata in order to determine the relative locations of all of the modular cells 107 and the offsets in their internal clocks. The cell controller 104 utilizes this information to schedule packet transmission from the modular cells 107 to the user equipment 112a, 112b.

In one embodiment, user equipment 112a and the user equipment 112b are mobile phones held by users. The mobile phones are configured to receive cellular communication services from the aggregate cell 102. The mobile phones broadcast signals that can be received by the modular cells 107 of the aggregate cell 102. The signals broadcast by the mobile phones can indicate the identities of the mobile phones and locations of the mobile phones. The modular cells 107 provide this data received from the mobile phones to the cell controller 104. The cell controller 104 can then determine which modular cells 107 should provide cellular communication services to the various mobile phones.

In one example, the cell controller 104 may determine that the primary modular cell 108a and the secondary modular cell 110c should provide cellular communication services to the user equipment 112a. The cell controller 104 thing schedule the primary modular cell 108a and the secondary modular cell 110c to provide identical data packets to the user equipment 112. The cell controller 104 schedules each primary modular cell 108a and the secondary modular cell 110c with timing selected to ensure that the data packets arrive at the user equipment 112 substantially simultaneously, within timing intolerances. The simultaneous reception of data packets from multiple modular cells 107 boost the signal-to-noise ratio of the data packets received by the user equipment 112a. The result is that fewer data packets will be lost by the user equipment 112a.

In one example, the cell controller 104 may determine that the primary modular cell 108b and the secondary modular cell 110b should provide cellular communication services to the user equipment 112b. The cell controller 104 can schedule the primary modular cell 108b and the secondary modular cell 110b to provide identical data packets to the user equipment 112b. The cell controller 104 schedules the primary modular cell 108b and the secondary modular cell 110b with timing selected to ensure that the data packets arrive at the user equipment 112b substantially simultaneously, within timing intolerances. The simultaneous reception of data packets from multiple modular cells 107 boosts the signal-to-noise ratio of the data packets received by the user equipment 112b. The result is that fewer data packets will be lost by the user equipment 112b.

As individuals carrying the user equipment 112a, 112b travel through the geographic region 118, the cell controller 104 can dynamically update which primary modular cells 107 communicate with each user equipment depending on locations of the user equipment 112a, 112b. Furthermore, in practice, there may be many more than two user equipment in the geographic area 118 of the aggregate cell 102 at any given time. The cell controller 104 can manage communication between the modular cells 107 of the aggregate cell 102 and the various user equipment 112 within the geographic area 118 of the aggregate cell 102.

In one embodiment, primary modular cells 108 would share a common out of band timing or clock source, but that common timing or clock source may have local differences driven by cable lengths, multipath propagation, network topology, and other sources of fixed offsets in the time of flight of the clock or timing signal. In one embodiment, the modular cells 107 and the cell controller 104 calibrate out these local influences on the clock.

Out of band timing sources 106 can include one or more of GPS, local atomic clocks, data over cable service interface specification (DOCSIS) or other sources to provide the clock to the primary module cell or cells. The secondary modular cells 107 receive the timing beacons and set their local internal clocks.

In one embodiment, when a primary modular cell 108 receives a timing beacon from another primary modular cell, the primary modular cell 108 is able to calculate the difference between its internal clock and the internal clock of the other primary modular cell. This offset is sent to the cell controller 104 to identify fixed and variable clock offsets between the various elements of the aggregate cell 102. The cell controller 104 then configures an offset on each internal clock. This offset is sent in the timing beacon from each primary modular cell. The secondary modular cells can then use the timing beacon or beacons to set their internal clocks with high fidelity.

In one embodiment, when there are several primary modular cells 108 within the aggregate cell 102, there is a potential for collisions when they send a timing beacon. If the primary modular cells 108 are within a certain distance of each other, all of their clocks are tightly synchronized and they send their timing beacon at the exact same moment, the secondary modular cells 110 will be able to receive the resultant timing beacon at an increased signal to noise ratio. This has great benefits in determining precisely when the pulse arrived, and thus the clock fidelity of the secondary modular cell. Conversely, if the primary modular cells 108 are not able to send simultaneous packets, these packets would interfere with each other. The cell controller 104 has the information required to determine whether the several timing beacons should be sent at the same time, or staggered. If the timing beacons should be sent in a staggered manner, the cell controller 104 can apply a hash value to each primary modular cell 108 in the aggregate cell 102. This hash would configure each primary modular cell source with the correct frequency, modulation, probability of sending the timing beacon.

Figure 3:
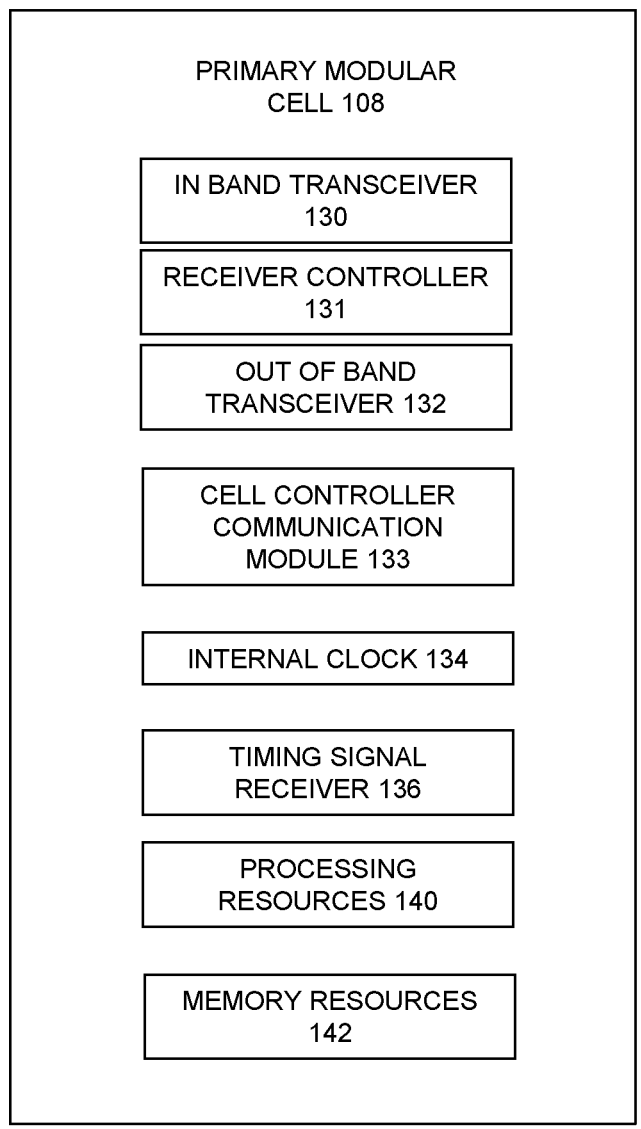
FIG. 3 is a block diagram of a primary modular cell, according to one embodiment.

FIG. 3 is a block diagram of the primary modular cell 108, according to one embodiment. The primary modular cell 108 includes an in band transceiver 130. The in band transceiver 130 transmits and receives cellular communication signals in one or more frequency bands assigned to the aggregate cell 102 of which the primary modular cell 108 is part. The cellular communication signals can include signals transmitted and received for initially establishing communication with a user equipment 112. The cellular communication signals can include data packets transmitted to and received from the user equipment 112. The data packets can include text data packets, voice data packets, image data packets, audio data packets, video data packets, and other types of data packets commonly transmitted across cellular communication networks.

In one example, the primary modular cell 108 as part of a new radio (NR) fifth-generation (5G) network operating in accordance with 3GPP standards. In this case, the primary modular cell 108 may be designated to communicate in frequency band centered on 850 MHz with a bandwidth of 10 MHz. In this case, the in band transceiver 130 is configured to transmit and receive cellular signals in the 10 MHz bandwidth frequency band around 850 MHz. Other frequency bands and bandwidths can be utilized without departing from the scope of the present disclosure. In one example, the frequency band is centered around 600 MHz.

In one embodiment, the primary modular cell 108 is configured to transmit and receive time beacons via the in band receiver 130. The timing beacons are described in relation to FIGS. 1 and 2. The primary modular cell 108 can transmit the timing beacons with the in band transceiver 130 in the frequency band designated for cellular communications in the aggregate cell 102.

In one embodiment, the primary modular cell 108 includes a cell controller communication module 133. The cell controller communication module 133 is configured to communicate with the cell controller 104. The cell controller communication module 133 can provide data to the cell controller 104 including timing beacon transmission timestamps, timing beacon reception timestamps, identification data associated with the primary modular cell 108, timestamps and identification data associated with a user equipment 112, and practice scheduling data. The cell controller communication module 133 can also receive, from the cell controller 104, packet scheduling data indicating when the primary modular cell 108 should transmit data packets to various user equipment 112 communicating with the primary modular cell 108. The cell controller communication module 133 can send and receive other types of data to and from the cell controller 104. In one example, the secondary modular cells 110 may also transmit timing beacons.

In one embodiment, the primary modular cell 108 includes an out of band transceiver 132. The out of band transceiver 132 is configured to transmit and receive wireless signals in a frequency band not designated for cellular communications of the aggregate cell 102. In one embodiment, the out of band transceiver 132 is configured to transmit and receive timing beacons as described previously in relation to FIGS. 1 and 2. In one embodiment, the out of band transceiver 132 is configured to transmit timing signals in a frequency band with a longer-range than the frequency band of the in band transceiver 130. This ensures that the timing beacons from the primary modular cell 108 will reach all of the other primary modular cells 108 and the secondary modular cells 110 of the aggregate cell 102.

In one embodiment, the out of band transceiver 132 transmits and receives signals in a frequency band designated for long range low power wireless area network (LoRaWAN) communications. For example, the out of band transceiver 132 may be configured to transmit and receive signals in a frequency band centered on 915 MHz. Such a frequency band may reliably carry timing beacons to all of the modular cells 107 in an aggregate cell 102. The out of band transceiver 132 can be configured to transmit timing beacons with a LoRaWAN protocol. The out of band transceiver 132 may also be configured to receive timing beacons from other primary modular cells 108 in the LoRaWAN protocol and frequency band.

In one embodiment, primary modular cells can periodically transmit LoRaWAN packets on a configurable set of frequencies. These frequencies can be in the industrial, scientific, and medical (ISM) band or in a private band. These downstream packets can be the rough equivalent of LoRaWAN beacons. These beacons can contain the same timing metadata as described above, including the exact time the packet was sent. The beacons can also include the exact location of the sender.

In one embodiment, using LoRaWAN to distribute small cell clocks can be accomplished with extensions used to carry the fine grained transmission time and the algorithms used to schedule the LoRaWAN packets and be sure that the beacons can be heard by all of the modular cells 107. LoRaWAN class B beacons are generally sent on "downstream" ISM frequencies.

The LoRaWAN standard has built in mechanisms to extend the beacon, but specific uses of this extension mechanism are not described in the standard. Bytes 3-127 of the standard LoRaWAN beacons are reserved for future use. The primary modular cells 108 can use 2 bytes of the reserved area for the precise timestamp at which the packet was sent by the transmitter. The timestamp can be the number of nanoseconds after the current second in which the packet was sent. When a modular cell 107 sends the timestamp information to the cell controller 104, the timestamp can include the triplet of internal clock time, the fine grained received time of its local clock, and the timestamp included in the timing message. This allows the cell controller 104 to calculate the relative clock offsets of each device.

In one embodiment, each modular cell 107 includes a LoRaWAN client and gateway chip. In this case, the modular cells 107 can use modified LoRaWAN Class B beaconing methods to distribute clock. When a given primary modular cell send its beacon, the other client chip in receiving modular cells 107 will receive the beacon as normal.

In one embodiment, a primary modular cell 108 can use a half-duplex gateway chip and program the gateway to listen to the timing beacons from the other modular cells 107 whenever it is not configured to send a timing beacon. This this can be accomplished using a field programmable gate array (FPGA) that does fine-grained timestamping on LoRaWAN packets.

In one embodiment, a primary modular cell 108 can use a client chipset and send a timing beacon on upstream frequencies. The other modular cells 107 can listen for timing beacons whenever they are not configured to send a timing beacon. The chipset may only support one frequency at a time. The modular cells 107 may need to be configured with a time-based shared algorithm that generates a pseudo random frequency to use. All of the devices within an aggregate cell 102 can use the same algorithm, and thus get the same pseudo-random frequency for every beacon.

In one embodiment, secondary modular cells 110 can send upstream packets to the gateways. These upstream packets can include a free-running clock of the secondary modular cell 110. A primary modular cell 108 can receive the upstream packet and precisely timestamp it. The primary modular cell can send the two timestamps to the cell controller 104. The cell controller 104 would be able to calculate the drift on the clock of the secondary modular cell and send a message to the secondary modular cell to adjust the clock.

In one embodiment, the cell controller 104 can modify the frequency at which data is sent by the secondary modular cells balance the number of packets sent against a target clock accuracy.

In one embodiment, the primary modular cell 108 includes an internal clock 134 and a timing signal receiver 136. The internal clock 134 includes a very fine resolution real time clock. The internal clock 134 can include one or more oscillators. Timing signal receiver 136 receives a timing signal from an out of band timing source 106. The internal clock 134 utilizes the out of band timing signals to maintain an accurate real-time clock in conjunction with the one or more oscillators. The timestamps from the internal clock 134 are used to timestamp all of the data sent and received by the primary modular cell 108. The rate at which the internal clock 134 runs is periodically adjusted by the cell controller 104 to account for variations in the internal clock 134 and the out of band timing source 106.

In an example in which the out of band timing source 106 is a GPS timing source, the timing signal receiver 136 is configured to receive GPS signals including the timing signals. The timing signal receiver 136 can include one or more GPS transceivers or receivers positioned to receive GPS timing signals. Alternatively, the timing signal receiver 136 can be communicatively coupled to a GPS transceiver and can receive timing signals via the GPS transceiver.

In an example in which the out of band timing source 106 is a video stream timing source, the timing signal receiver 136 is configured to receive immediate stream and extracted timing signal from the media stream. In an example in which the primary modular cell is part of a media receiving device that receives a satellite or cable media stream, the media stream is passed through the timing signal receiver 136. The timing signal receiver 136 is configured to extract the timing signal from the cable or satellite media stream. In one example, the media stream is an MPEG-2 transport stream.

In one embodiment, the primary modular cell 108 includes processing resources 140 and memory resources 142. The memory resources 142 include one or more computer readable media that store software instructions for providing cellular communication services related to the aggregate cell 102. The memory resources 142 can include software instructions for performing the various functions associated with the primary modular cell 108 as described herein. The processing resources 140 execute the instructions stored in one or more computer readable media of the memory resources 142. One or more of the components of the primary modular cell 108 may include or be implemented in conjunction with the processing resources 140 and the memory resources 142.

In one embodiment, the primary modular cell 108 includes a receiver controller 131 that controls the in-band receiver 130 and the other components and functions of the primary modular cell 108. The primary modular cell 108 may also include a packet scheduler 133. Some packet scheduling may be dictated by the cell controller 104 and other packet scheduling may be determined by a packet scheduler of the primary modular cell 108.

Though not shown in FIG. 3, a secondary modular cell 110 may include the same components, modules, and functionalities as the primary modular cell 108. However, the secondary modular cell 110 may not have a timing signal receiver as the secondary modular cell 110 differs from the primary modular cell 108 in that the secondary modular cell 110 does not generate primary timing beacons. However, in some embodiments the secondary modular cell 110 may also generate timing beacons.

Figure 4:
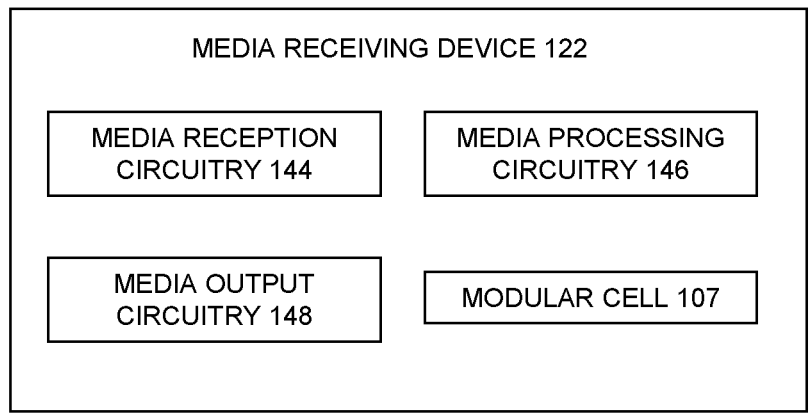
FIG. 4 is a block diagram of a media receiving device, according to one embodiment.

FIG. 4 is a block diagram of a media receiving device 122, according to one embodiment. The media receiving device 122 includes media reception circuitry 144, media processing circuitry 146, media output circuitry 148, and a modular cell 107. The media receiving device 122 can further include processing resources and memory resources separate from or dispersed among the various components of the aggregate cell.

The media reception circuitry 144 can include circuitry for receiving immediate stream. The media reception circuitry 144 can include one or more ports for receiving wired connections that deliver the media stream to the media receiving device 122. The media reception circuitry 144 can include one or more wireless transceivers configured to wirelessly receive the media stream. The media reception circuitry 144 can include digital signal processors, digital to analog converters, analog-to-digital converters, or other circuitry that can assist in receiving a media stream. The media stream can include a video stream, and audio stream, a combination of video and audio streams, text streams, or other types of streams. The media reception circuitry 144 can include processing, memory, and data transmission resources. The media reception circuitry 144 can include capabilities for timestamping incoming streams in memory, recognizing that a trigger has been received, and then examining the low level signals in memory to find the exact start/end of the trigger.

The media processing circuitry 146 can include circuitry and other computing resources for processing the media stream received by the media reception circuitry 144. The media processing circuitry 146 can include software and circuitry for transforming, compressing, decompressing, or otherwise processing the media stream. The media processing circuitry 146 can include circuitry for extracting timing signals or timing data from the media stream. The media processing circuitry 146 can include processing, memory, and data transmission resources.

The media output circuitry 148 is configured to output the processed media stream. The media output circuitry 148 can output the processed media stream to an electronic device external to the media receiving device 122. The media output circuitry 148 can include one or more ports for outputting the media stream to an external electronic device via a wired connection. The media output circuitry 148 can include one or more wireless transceivers configured to transmit the media stream to an external electronic device. The media output circuitry 140 can include a display configured to display the media stream. The media output circuitry 148 can include processing, memory, and data transmission resources.

The modular cell 107 can be a primary modular cell 108 or secondary modular cell 110 as described in relations to FIGS. 1-3. The modular cell 107 may receive the timing signal extracted by the media processing circuitry 146. Alternatively, the modular cell 107 may extract the timing signals from the media stream or from a separate out of band timing source 106.

Figure 5:
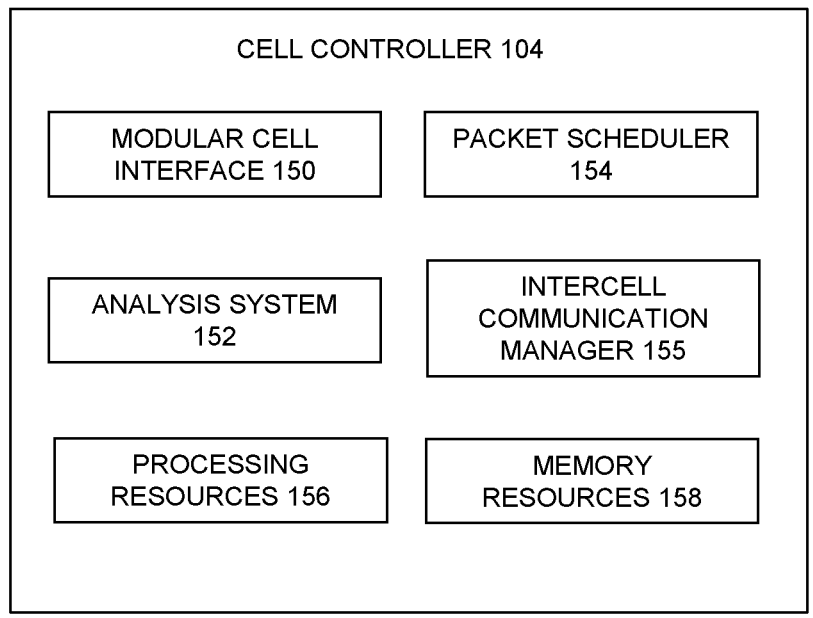
FIG. 5 is a block diagram of a cell controller, according to one embodiment.

FIG. 5 is a block diagram of a cell controller 104, according to one embodiment. The cell controller 104 includes a modular cell interface 150. The modular cell interface is configured to interface with the modular cells 107, such as primary modular cells 108 and primary modular cells 110 described in relation to FIGS. 1-4. The modular cell interface 150 can receive metadata from the modular cells 107. The metadata can include planning become reception timestamps, timing became transmission timestamps, geolocation data, device identification codes, or other types of data. The modular cell phase 150 can provide transmission or packet scheduling data or commands to the modular cells 107. Accordingly, the modular cell and phase 150 facilitates communication between the cell controller 104 and the modular cells 107 of an aggregate cell 102.

In one embodiment, the cell controller 104 includes an analysis system 152. The analysis system 152 analyzes the reception timestamps, transmission timestamps, and other types of metadata or data received from the modular cells 107 via the modular cell interface 150. In particular, the analysis system 152 can determine internal clock offsets between the various modular cells 107. The analysis system 152 can determine the relative distances between the various modular cells 107 and user equipment 112. The analysis system 152 can determine the exact location of modular cells 107 and user equipment 112. The analysis system 152 can determine the length of cable connecting a satellite receiver to a modular cell 107 based on the timing offsets, locations, and signal latencies associated with the various modular cells 107.

In one embodiment, the cell controller 104 includes a packet scheduler 154. The packet scheduler 154 schedules the transmission of packets from the various modular cells 107 to the various user equipment 112 in the geographic area of the aggregate cell 102. The packet scheduler 154 schedules and transmission of packets based on the timing offsets, signal latencies, distances, geographic locations, and other factors derived by the analysis system 152. The packet scheduler 154 can determine whether multiple modular cells 107 will transmit the same data packets to a single user equipment 112 for an additive effect. The packet scheduler 154 can schedule other types of transmissions from the modular cells 107. The packet scheduler 154 can also determine which modular cells 107 will communicate with which user equipment 112.

In one embodiment, the cell controller 104 includes an intercell communication manager 155. The intercell communication manager 155 communicates with adjacent aggregate cells and manages handoffs between the aggregate cell 102 and adjacent aggregate cells. Accordingly, the intercell communication manager 155 manages transferring cellular communications services for user equipment entering the geographic area of the aggregate cell 102 from an adjacent aggregate cell or for user equipment exiting the geographic area of the aggregate cell 102 into an adjacent aggregate cell.

In one embodiment, the primary modular cell 108 includes processing resources 156 and memory resources 158. The memory resources 158 include one or more computer readable media that store software instructions for providing cellular communication services related to the aggregate cell 102. The memory resources 158 can include software instructions for performing the various functions associated with the primary modular cell 108 as described herein. The processing resources 156 execute the instructions stored in one or more computer readable media of the memory resources 158. One or more of the components of the primary modular cell 108 may include or be implemented in conjunction with the processing resources 156 and the memory resources 158. The cell controller 104 can be implemented in the cloud. The cell controller 104 can include virtual processing and memory resources. Alternatively, so controller 104 can be implemented in hardware within the geographic location of the aggregate cell 102.

Figure 6:
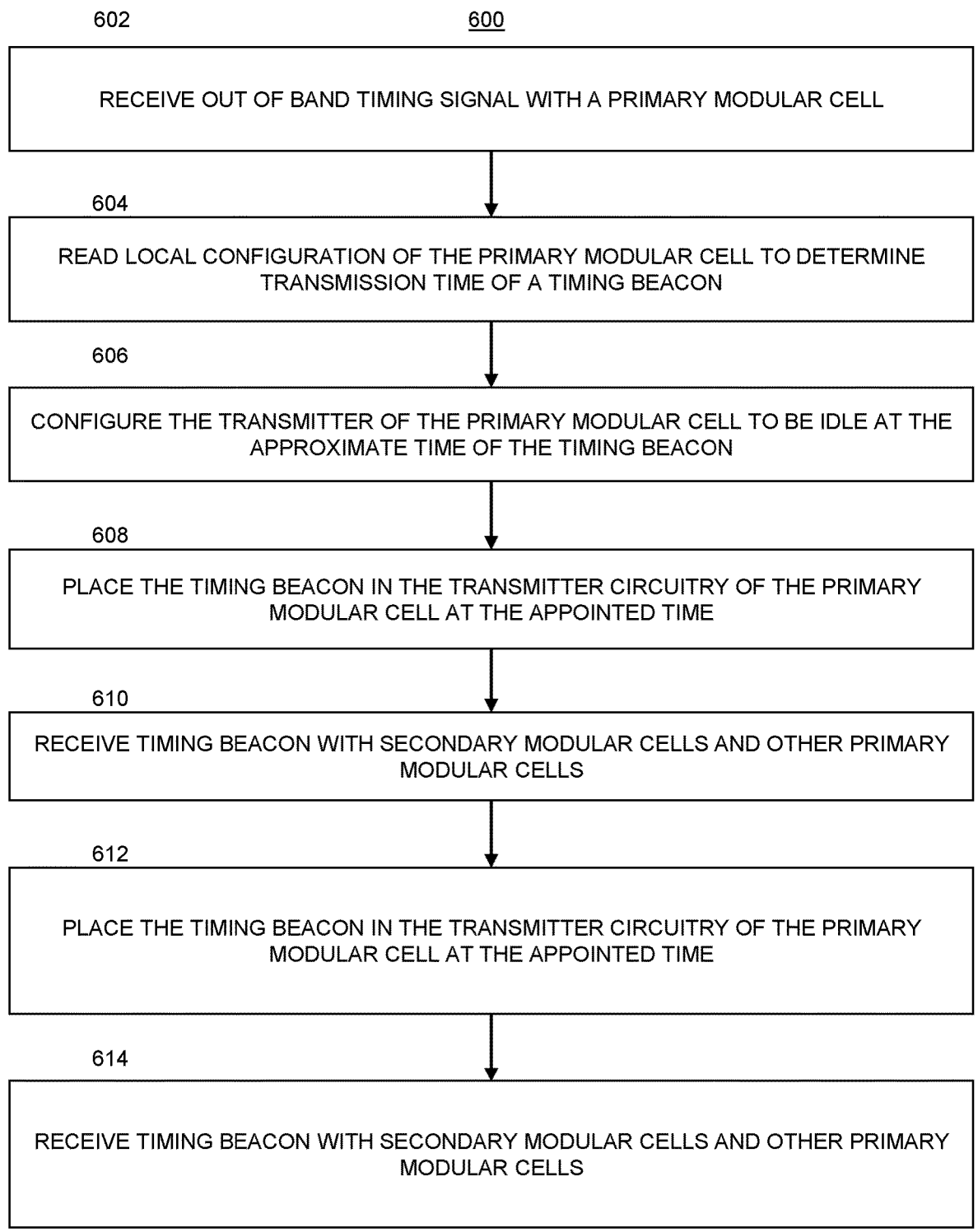
FIG. 6 is flow diagram of a process for providing cellular communication service, according to one embodiment.

FIG. 6 is a flow diagram of a method 600 for providing cellular communication services, according to one embodiment. The various aspects of the method 600 can be utilized using any of the components, processes, methods, and functionality described in relation to FIGS. 1-5. Furthermore, the systems, components, and devices described in relation to FIGS. 1-5 can utilize processes described in relation to the method 600.

At 602, a primary modular cell receives an out of band timing signal from and out of band timing source. The primary modular cell can follow a selected protocol to generate a timing beacon interval. For example, the primary modular cell can send one timing beacon every second.

At 604, the primary modular cell reads a local configuration to determine the transmission timing of the timing beacon. One example, the transmission time of the timing beacon is at the exact end of the out of band timing signal. In one example, the transmission time of the timing beacon is at a time of an internal interval signal. In one example, the transmission time of the timing beacon is at a fixed offset from the out of band timing signal or the internal interval signal.

In one embodiment, at 606 the primary modular cell configures its transceiver to the idle at the approximate time of the next timing beacon.

In one embodiment, at 608, the primary modular cell places the timing beacon data in the transceiver at the scheduled time. In one embodiment, the primary modular cell utilizes a fixed duration logic to trigger the transmission of the timing beacon. The timing beacon can include the exact time of transmission, the Mac address of the primary modular cell, the exact location of the primary modular cell, the length of the cables connected to the primary modular cell, and the exact location of the transceiver antenna of the primary modular cell.

In one embodiment, at 610 secondary modular cells and other primary cells receive the timing beacon. The secondary modular cells and the other primary cells may receive the timing beacon through a general-purpose packet processing path. A timestamp is included on all of the I/Q symbols. The I/Q symbols are kept in memory until the process identifies if they are timing beacons are not. When a timing beacon is found, a second pass is made through the I/Q symbols looking for a specific part of the packet, typically the end of the preamble, to read the timestamps associated with the I/Q Values and to know precisely when the packet was received.

In one embodiment, at 610, the primary modular cells and secondary modular cells send timestamps to the cell controller. The cell controller is able to correlate the time the pulses were sent with time that they received by each of the primary modular cells and secondary modular cells. Using this knowledge, in combination with metadata regarding location and cable length, the cell controller is able to configure the clock offset on each of the primary and secondary modular cells. The cell controller is also able to track an error in the clock synchronization on each of the components. The cell controller is able to determine what level cell edge control is appropriate.

Figure 7:
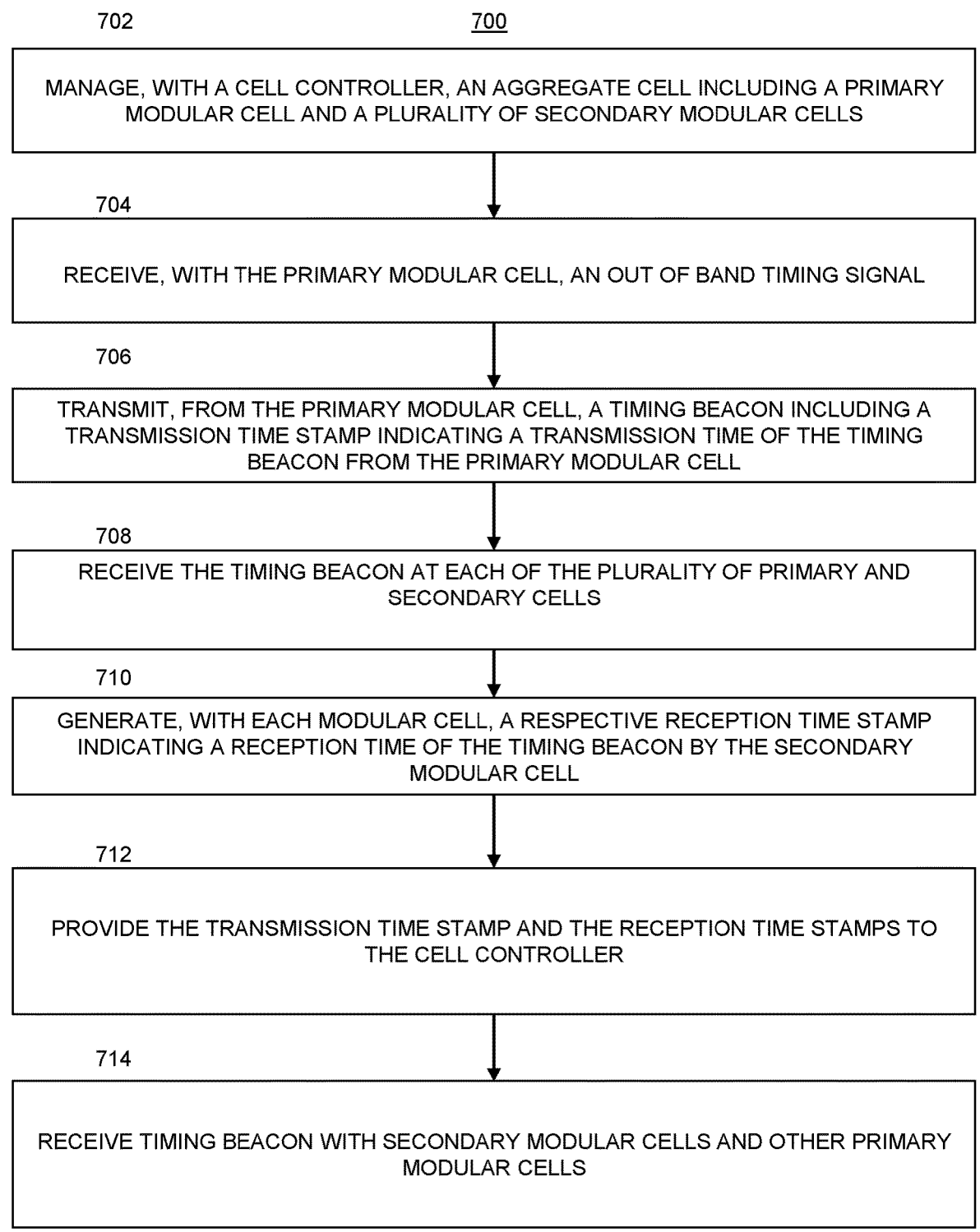
FIG. 7 is flow diagram of a process for providing cellular communication service, according to one embodiment.

FIG. 7 is a flow diagram of a method 700 for providing cellular communication services, according to one embodiment. The various aspects of the method 700 can be utilized using any of the components, processes, methods, and functionality described in relation to FIGS. 1-6. Furthermore, the systems, components, processes and devices described in relation to FIGS. 1-6 can utilize processes described in relation to the method 700.

At 702, the method 700 includes managing, with a cell controller, an aggregate cell including a primary modular cell and a plurality of secondary modular cells. At 704, the method 700 includes receiving, with the primary modular cell, an out of band timing signal. At 706, the method 700 includes transmitting, from the primary modular cell, a timing beacon including a transmission time stamp indicating a transmission time of the timing beacon from the primary modular cell. At 708, the method 700 includes receiving the timing beacon at each of the plurality of primary and secondary cells. At 710, the method 700 includes generating, with each modular cell, a respective reception time stamp indicating a reception time of the timing beacon by the secondary modular cell. At 712, the method 700 includes providing the transmission time stamp and the reception time stamps to the cell controller. At 714, the method 700 includes calculating, with the cell controller, a respective a clock offset for each secondary modular cell based on the timing stamp.

Figure 8:
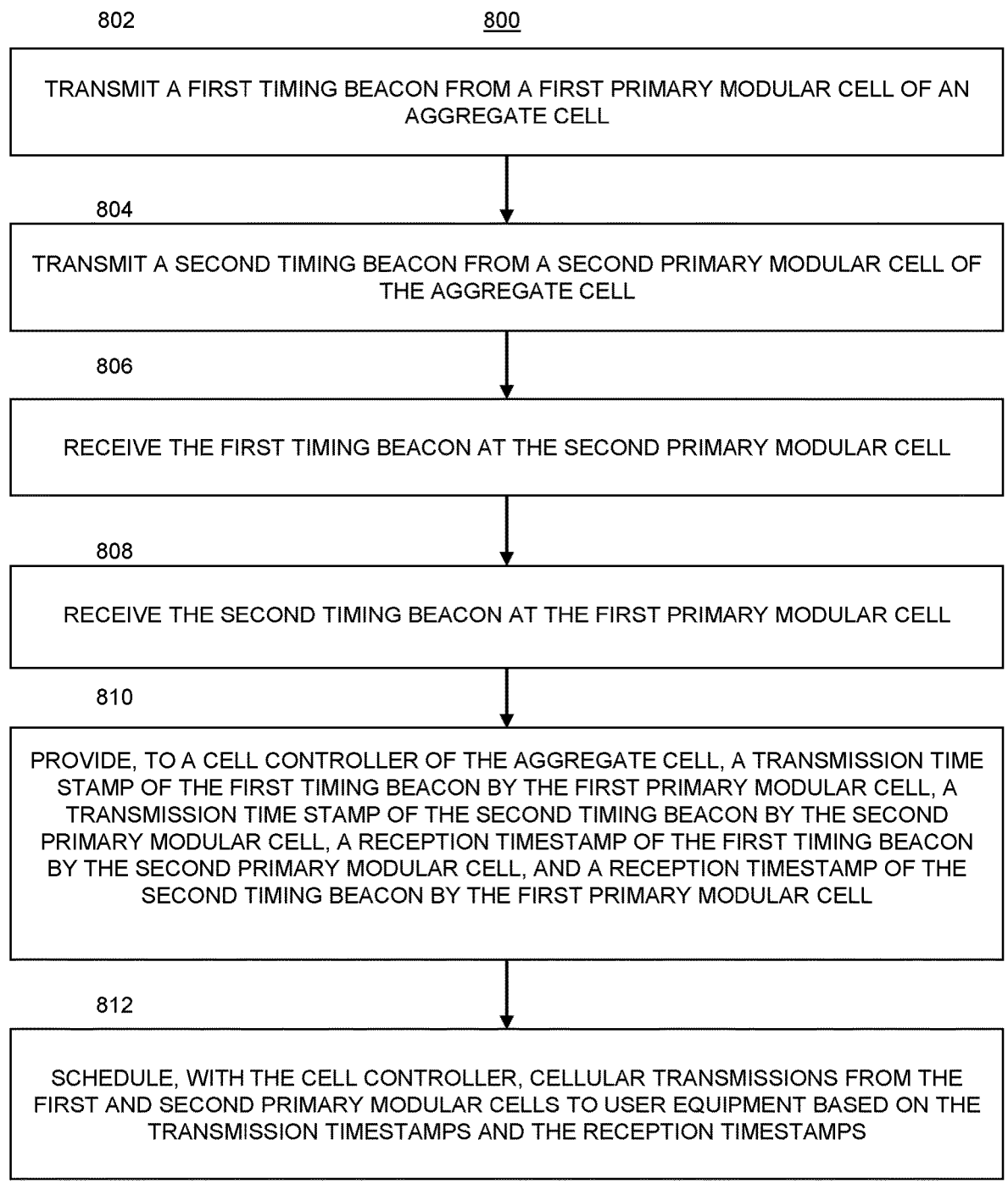
FIG. 8 is flow diagram of a process for providing cellular communication service, according to one embodiment.

FIG. 8 is a flow diagram of a method 800 for providing cellular communication services, according to one embodiment. The various aspects of the method 800 can be utilized using any of the components, processes, methods, and functionality described in relation to FIGS. 1-7. Furthermore, the systems, components, processes, and devices described in relation to FIGS. 1-7 can utilize processes described in relation to the method 800.

At 802, the method 800 includes transmitting a first timing beacon from a first primary modular cell of an aggregate cell. At 804, the method 800 includes transmitting a second timing beacon from a second primary modular cell of the aggregate cell. At 806, the method 800 includes receiving the first timing beacon at the second primary modular cell. At 808, the method 800 includes receiving the second timing beacon at the first primary modular cell. At 810, the method 800 includes providing, to a cell controller of the aggregate cell, a transmission time stamp of the first timing beacon by the first primary modular cell, a transmission time stamp of the second timing beacon by the second primary modular cell, a reception timestamp of the first timing beacon by the second primary modular cell, and a reception timestamp of the second timing beacon by the first primary modular cell. At 804, the method 800 includes scheduling, with the cell controller, cellular transmissions from the first and second primary modular cells to user equipment based on the transmission timestamps and the reception timestamps.

Figure 9:
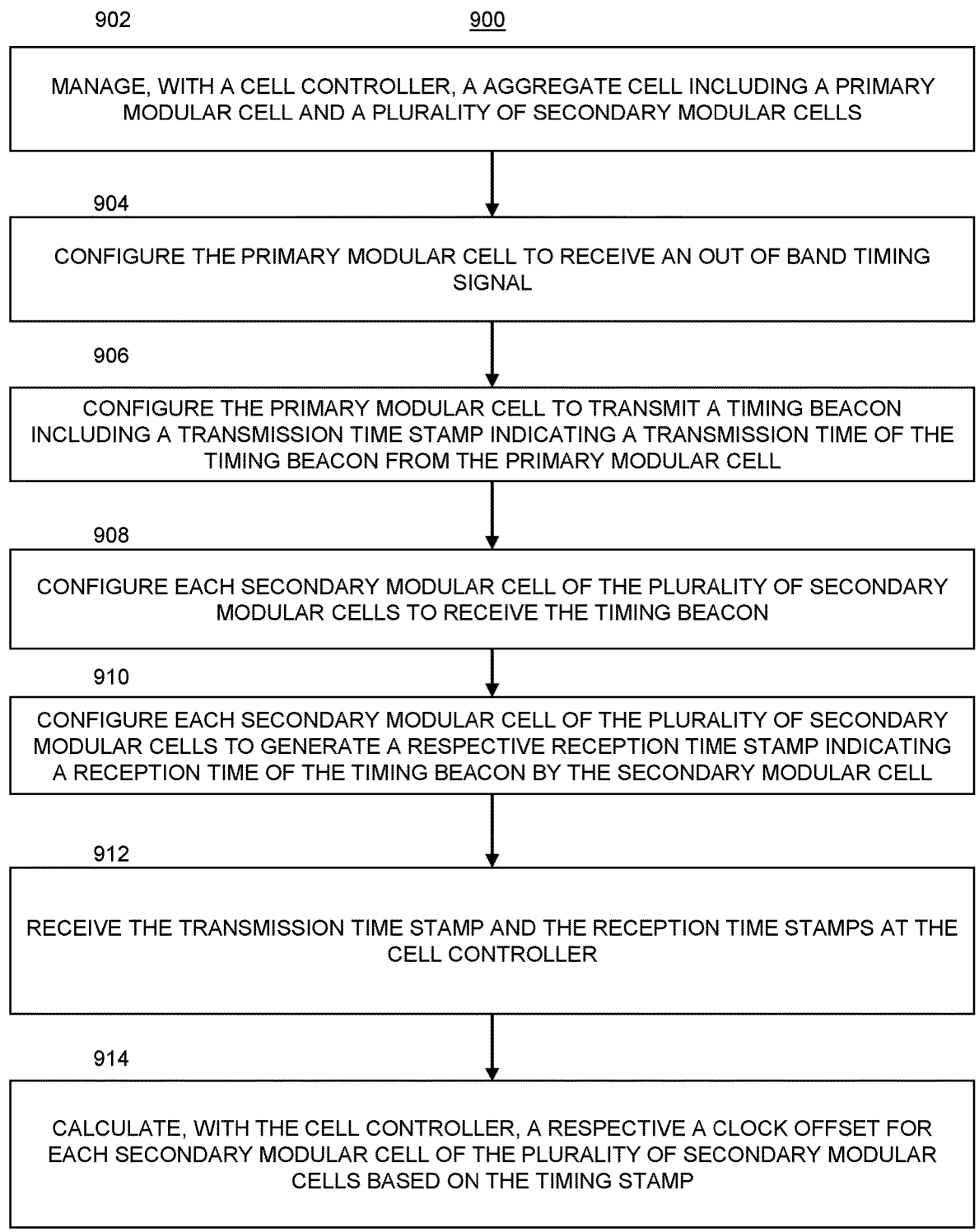
FIG. 9 is flow diagram of a process for providing cellular communication service, according to one embodiment.

FIG. 9 is a flow diagram of a method 900 for providing cellular communication services, according to one embodiment. The various aspects of the method 900 can be utilized using any of the components, processes, methods, and functionality described in relation to FIGS. 1-8. Furthermore, the systems, components, processes, and devices described in relation to FIGS. 1-8 can utilize processes described in relation to the method 900.

At 902, the method 900 includes managing, with a cell controller, an aggregate cell including a primary modular cell and a plurality of secondary modular cells. At 904, the method 900 includes configuring the primary modular cell to receive an out of band timing signal. At 906, the method 900 includes configuring the primary modular cell to transmit a timing beacon including a transmission time stamp indicating a transmission time of the timing beacon from the primary modular cell. At 908, the method 900 includes configuring each secondary modular cell of the plurality of secondary modular cells to receive the timing beacon. At 910, the method 900 includes configuring each secondary modular cell of the plurality of secondary modular cells to generate a respective reception time stamp indicating a reception time of the timing beacon by the secondary modular cell. At 912, the method 900 includes receiving the transmission time stamp and the reception time stamps at the cell controller. At 914, the method 900 includes calculating, with the cell controller, a respective a clock offset for each secondary modular cell of the plurality of secondary modular cells based on the timing stamp.

Figure 10:
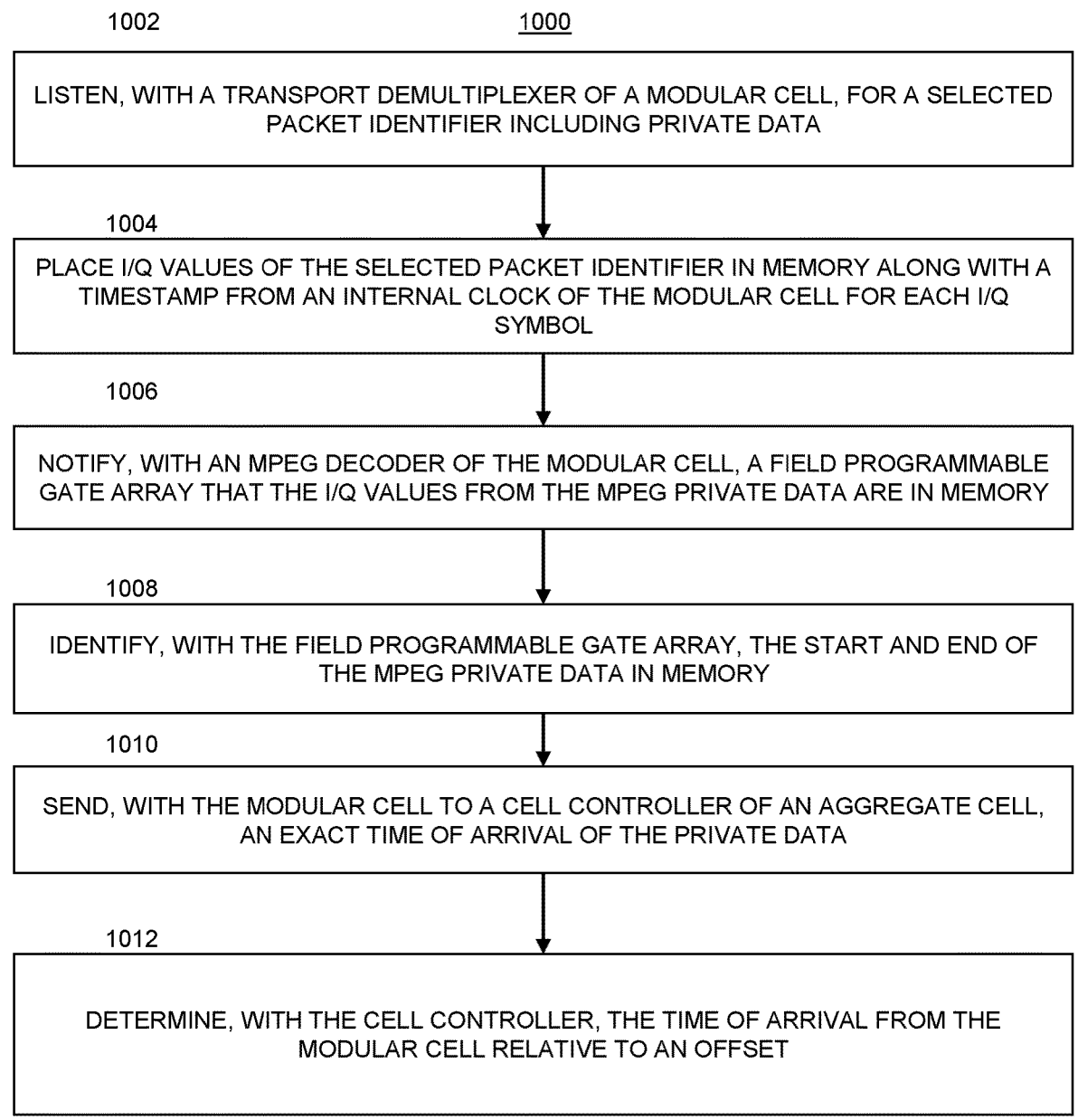
FIG. 10 is flow diagram of a process for providing cellular communication service, according to one embodiment.

FIG. 10 is a flow diagram of a method 1000 for providing cellular communication services, according to one embodiment. The various aspects of the method 900 can be utilized using any of the components, processes, methods, and functionality described in relation to FIGS. 1-9. Furthermore, the systems, components, processes, and devices described in relation to FIGS. 1-9 can utilize processes described in relation to the method 1000.

At 1002, the method 1000 includes listening, with a transport demultiplexer of a modular cell, for a selected packet identifier including MPEG private data. At 1004, the method 1000 includes placing I/Q values of the selected packet identifier in memory along with a timestamp from an internal clock of the modular cell for each symbol. 1006, the method 1000 includes notifying, with an MPEG decoder of the modular cell, a field programmable gate array that the I/Q values from the MPEG private data are in memory. At 1008, method 1000 includes identifying, with the field programmable gate array, the start and end of the MPEG private data in memory. At 1010, the method 1000 includes sending, with the modular cell to a cell controller of an aggregate cell, an exact time of arrival of the private data. At 1012, the method 1000 includes determining, with the cell controller, the time of arrival from the modular cell relative to an offset.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cell controller comprising:
   at least one processor;
   at least one computer-readable medium that stores software instructions that, when executed by the at least one processor, causes operations to be performed, the operations including:
   managing an aggregate cell including a primary modular cell and a plurality of secondary modular cells;
   configuring the primary modular cell to receive an out of band timing signal;
   configuring the primary modular cell as a master timing cell to transmit a timing beacon including a transmission time stamp indicating a transmission time of the timing beacon from the primary modular cell;
   receiving, from the primary module cell, a transmission time stamp included in a timing beacon transmitted by the primary module cell, wherein the transmission time stamp indicates a transmission time of the timing beacon from the primary modular cell;
   receiving, from the primary module cell, a reception time stamps wherein each reception time stamp of the reception time stamps is generated by a respective secondary modular cell of the plurality of secondary modular cell; and
   calculating a respective a clock offset for each secondary modular cell of the plurality of secondary modular cells based on the reception time stamps.

2. The cell controller of claim 1, wherein the operations further include causing cellular communication services to be provided to user equipment with the primary modular cell and the secondary modular cells.

3. The cell controller of claim 2, wherein the operations further include scheduling, with the cell controller, data transmission from the primary modular cell and the secondary modular cells to the user equipment based on the respective clock offsets.

4. The cell controller of claim 1, wherein the operations further include:
   scheduling, with the cell controller, transmission of data packets from the plurality of secondary modular cells to be received additively by the user equipment based on a location of the user equipment and the respective clock offsets of the secondary modular cells.

5. The cell controller of claim 1, wherein the timing signal is received from a GPS signal.

6. The cell controller of claim 1 wherein the timing signal is received from a television stream.

7. The cell controller of claim 1, wherein the operations further include transmitting the timing beacon on a frequency band of the aggregate cell.

8. The cell controller of claim 1, wherein the timing beacon outside a frequency band of the aggregate cell.

9. The cell controller of claim 8, wherein the timing beacons is transmitted with a Low Power Wide Area Network protocol.

10. The cell controller of claim 1, wherein the primary modular cell is a media receiving device.

11. The cell controller of claim 10, wherein the media receiving device is a satellite television set-top box coupled to a satellite receiver.

12. The cell controller of claim 1, wherein the timing beacon includes a location of the primary modular cell.

13. The cell controller of claim 1, wherein the timing beacon includes a MAC address of the primary modular cell.

14. The cell controller of claim 1, wherein the aggregate cell is a 5G cellular communication cell.

15. A method comprising:
    managing an aggregate cell including a primary modular cell and a plurality of secondary modular cells;
    configuring the primary modular cell to receive an out of band timing signal;
    configuring the primary modular cell as a master timing cell to transmit a timing beacon including a transmission time stamp indicating a transmission time of the timing beacon from the primary modular cell;
    receiving, from the primary module cell, a transmission time stamp included in a timing beacon transmitted by the primary module cell, wherein the transmission time stamp indicates a transmission time of the timing beacon from the primary modular cell;
    receiving, from the primary module cell, a reception time stamps wherein each reception time stamp of the reception time stamps is generated by a respective secondary modular cell of the plurality of secondary modular cells and indicates a reception time of the timing beacon by the respective secondary modular cell; and
    calculating a respective a clock offset for each secondary modular cell of the plurality of secondary modular cells based on the reception time stamps.

16. The method of claim 15, further comprising causing cellular communication services to be provided to user equipment with the primary modular cell and the secondary modular cells.

17. The method of claim 16, further comprising scheduling, with a cell controller, data transmission from the primary modular cell and the secondary modular cells to the user equipment based on the respective clock offsets.

18. The method of claim 15, further comprising:
    scheduling, with a cell controller, transmission of data packets from the plurality of secondary modular cells to be received additively by the user equipment based on a location of the user equipment and the respective clock offsets of the secondary modular cells.

19. The method of claim 15, wherein the timing signal is received from a GPS signal.

20. The method of claim 15, wherein the timing signal is received from a television stream.

* * * * *

UNITED STATES PATENT AND TRADEMARK OFFICE
CERTIFICATE OF CORRECTION

PATENT NO. : 11,956,072 B2  
APPLICATION NO. : 18/111387  
DATED : April 9, 2024  
INVENTOR(S) : David Zufall et al.

Page 1 of 1

It is certified that error appears in the above-identified patent and that said Letters Patent is hereby corrected as shown below:

On the Title Page

Item (71) Applicant: "WIRELSS" should be -- WIRELESS --

In the Claims

Claim 1, Column 19:
Line 28: "cell" should be -- cells --
Line 28: after "module cell" and before "; and" insert -- and indicates a reception time of the timing beacon by the respective secondary modular cell --

Claim 9, Column 20:
Line 2: "beacons" should be -- beacon --

Signed and Sealed this
Fourth Day of June, 2024

Katherine Kelly Vidal
*Director of the United States Patent and Trademark Office*